United States Patent
Kayano

(10) Patent No.: US 10,311,736 B2
(45) Date of Patent: Jun. 4, 2019

(54) ROAD SHAPE INFORMATION GENERATOR, ROAD SHAPE INFORMATION DISTRIBUTION SYSTEM AND ROAD SHAPE INFORMATION GENERATION PROGRAM

(71) Applicant: DENSO CORPORATION, Kariya, Aichi-pref. (JP)

(72) Inventor: Masayoshi Kayano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 5 days.

(21) Appl. No.: 15/538,969

(22) PCT Filed: Jan. 7, 2016

(86) PCT No.: PCT/JP2016/000061
§ 371 (c)(1),
(2) Date: Jun. 22, 2017

(87) PCT Pub. No.: WO2016/114113
PCT Pub. Date: Jul. 21, 2016

(65) Prior Publication Data
US 2017/0352279 A1    Dec. 7, 2017

(30) Foreign Application Priority Data
Jan. 15, 2015  (JP) .................. 2015-005906

(51) Int. Cl.
*G08G 1/16*   (2006.01)
*G08G 1/0967*   (2006.01)
(Continued)

(52) U.S. Cl.
CPC ............. *G08G 1/167* (2013.01); *G01C 21/32* (2013.01); *G06T 1/0007* (2013.01);
(Continued)

(58) Field of Classification Search
CPC ............. G08G 1/167; G08G 1/096775; G08G 1/096758; G08G 1/096716; G08G 1/0141;
(Continued)

(56) References Cited

U.S. PATENT DOCUMENTS 6,470,265 B1 * 10/2002 Tanaka .................. G01C 11/00
701/532
6,597,986 B2 * 7/2003 Mikame ............. G01C 21/3632
340/990
(Continued)

FOREIGN PATENT DOCUMENTS

JP    2002054934 A    2/2002
JP    2002310680 A    10/2002
(Continued)

*Primary Examiner* — Frederick M Brushaber
(74) *Attorney, Agent, or Firm* — Harness, Dickey & Pierce, P.L.C.

(57) ABSTRACT

A road shape information generator is provided. The road shape information generator includes a sensor value obtainer that obtains a sensor value acting, when a vehicle travels, on the vehicle, a road shape information generator that generates information about a road shape as road shape information based on the sensor value obtained by the sensor value obtainer, and a storage controller that stores, in a road shape information storage, the road shape information generated by the road shape information generator.

15 Claims, 6 Drawing Sheets

(51) Int. Cl.
  *G08G 1/01* (2006.01)
  *G01C 21/32* (2006.01)
  *G06T 1/00* (2006.01)

(52) U.S. Cl.
  CPC ......... *G08G 1/0112* (2013.01); *G08G 1/0129* (2013.01); *G08G 1/0141* (2013.01); *G08G 1/096716* (2013.01); *G08G 1/096758* (2013.01); *G08G 1/096775* (2013.01)

(58) Field of Classification Search
  CPC .... G08G 1/0112; G08G 1/0129; G01C 21/32; G06T 1/0007
  See application file for complete search history.

(56) References Cited

U.S. PATENT DOCUMENTS

| | | | | |
|---|---|---|---|---|
| 8,026,835 | B2* | 9/2011 | Denaro | G06F 17/30241 |
| | | | | 340/905 |
| 8,332,143 | B2* | 12/2012 | Denaro | G01C 21/3697 |
| | | | | 340/995.1 |
| 8,467,810 | B2* | 6/2013 | Kaplan | G01C 21/32 |
| | | | | 455/404.1 |
| 8,589,063 | B2* | 11/2013 | Trum | G01C 21/3476 |
| | | | | 701/400 |
| 8,775,073 | B2* | 7/2014 | Denaro | G01C 21/26 |
| | | | | 701/450 |
| 9,134,133 | B2* | 9/2015 | Denaro | G01C 21/32 |
| 9,234,759 | B2* | 1/2016 | Bjernetun | B60W 50/0098 |
| 2001/0003436 | A1* | 6/2001 | Yoshikawa | B60K 28/066 |
| | | | | 340/439 |
| 2007/0191997 | A1* | 8/2007 | Isaji | B60T 7/22 |
| | | | | 701/1 |
| 2008/0061950 | A1* | 3/2008 | Kawasaki | G06K 9/00798 |
| | | | | 340/425.5 |
| 2009/0009305 | A1* | 1/2009 | Kataoka | B60W 50/14 |
| | | | | 340/435 |
| 2010/0226532 | A1* | 9/2010 | Hayasaka | G06K 9/6203 |
| | | | | 382/103 |
| 2011/0218724 | A1* | 9/2011 | Iida | G01C 21/32 |
| | | | | 701/70 |
| 2011/0238252 | A1* | 9/2011 | Takeda | B60W 40/072 |
| | | | | 701/31.4 |
| 2012/0185167 | A1* | 7/2012 | Higuchi | G01C 21/3602 |
| | | | | 701/461 |
| 2013/0131925 | A1* | 5/2013 | Isaji | B62D 6/00 |
| | | | | 701/41 |
| 2013/0245945 | A1* | 9/2013 | Morita | G08G 1/096716 |
| | | | | 701/533 |
| 2014/0136015 | A1* | 5/2014 | Hayakawa | B60T 7/22 |
| | | | | 701/1 |
| 2015/0063648 | A1* | 3/2015 | Minemura | G06K 9/6217 |
| | | | | 382/104 |
| 2015/0371542 | A1* | 12/2015 | Fujishiro | B60W 50/14 |
| | | | | 701/41 |
| 2016/0102986 | A1* | 4/2016 | Ma | G08G 1/0112 |
| | | | | 702/5 |
| 2017/0166122 | A1* | 6/2017 | Ando | B60Q 9/00 |
| 2017/0352279 | A1* | 12/2017 | Kayano | G06T 1/0007 |
| 2018/0265084 | A1* | 9/2018 | Inou | B60W 30/10 |

FOREIGN PATENT DOCUMENTS

| | | |
|---|---|---|
| JP | 2007225911 A | 9/2007 |
| JP | 2008186129 A | 8/2008 |
| JP | 2010091317 A | 4/2010 |
| JP | 2011118795 A | 6/2011 |
| JP | 2012093974 A | 5/2012 |

\* cited by examiner

ROAD SHAPE INFORMATION GENERATOR, ROAD SHAPE INFORMATION DISTRIBUTION SYSTEM AND ROAD SHAPE INFORMATION GENERATION PROGRAM

CROSS REFERENCE TO RELATED APPLICATIONS

This application is a U.S. National Phase Application under 35 U.S.C. 371 of International Application No. PCT/JP2016/000061 filed on Jan. 7, 2016 and published in Japanese as WO 2016/114113 A1 on Jul. 21, 2016. This application is based on and claims the benefit of priority from Japanese Patent Application No. 2015-005906 filed on Jan. 15, 2015. The entire disclosures of all of the above applications are incorporated herein by reference.

TECHNICAL FIELD

The present disclosure relates to a road shape information generator that generates information about a road shape, a road shape information distribution system and a road shape information generation program.

BACKGROUND ART

As a conventional configuration for generating an object moving path, there is a configuration which takes images of a flying object to obtain image data and performs processing and analysis of the image data obtained (see, for example, Patent Literature 1).

PRIOR ART LITERATURE

Patent Literature

Patent Literature 1: JP2011-118795

SUMMARY OF INVENTION

Applying Patent Literature 1 to cases where the moving object is a vehicle (automobile) enables generation of information about a road shape (road shape information), for example, a road inclination angle and a road curve radius. A configuration for generating road shape information by applying Patent Literature 1, however, requires means for imaging a vehicle traveling on a road and also means for processing and analyzing captured image data. Hence, a high-spec CPU and a large-capacity memory are required, causing the configuration to become complicated and the cost to increase.

In view of the above circumstances, an object of the present disclosure is to provide a road shape information generator, a road shape information distribution system and a road shape information generation program which make it possible, without complicating the configuration involved and increasing the cost required, to appropriately generate road shape information and to put the generated information in effective use.

A road shape information generator in an example of the present disclosure is road shape information generator that comprises: a sensor value obtainer that obtains a sensor value acting, when a vehicle travels, on the vehicle; a road shape information generator that generates information about a road shape as road shape information based on the sensor value obtained by the sensor value obtainer; and a storage controller that stores, in a road shape information storage, the road shape information generated by the road shape information generator.

The road shape information generator may further comprise a first communication controller that causes the road shape information stored in the road shape information storage to be transmitted from a first communicator to a server. The road shape information generator and the server may configure a road shape information distribution system.

A road shape information generation program in an example of the present disclosure is a road shape information generation program that causes a controller of a road shape information generator to perform: a first procedure of obtaining a sensor value acting on a vehicle when the vehicle travels; a second procedure of generating information about a road shape as road shape information based on the sensor value obtained by performing the first procedure; and a third procedure of storing the road shape information generated by performing the second procedure in the road shape information storage.

The above road shape information generator, road shape information distribution system and road shape information generation program, without using either of means for imaging a vehicle traveling on a road and means for processing and analyzing image data, generates road shape information based on a sensor value acting on the vehicle traveling on a road and stores the generated road shape information. This allows road shape information to be appropriately generated without requiring any high-spec CPU or large-capacity memory and without causing configuration complication or a cost increase. Moreover, storing the generated road shape information makes it possible to process and outwardly transmit the generated road shape information, so that the road shape information can be effectively utilized.

BRIEF DESCRIPTION OF DRAWINGS

The above and other objects, features and advantages of the present disclosure will become more apparent from the following detailed description made with reference to the attached drawings. In the drawings.

EMBODIMENT FOR CARRYING OUT INVENTION

Figure 1:
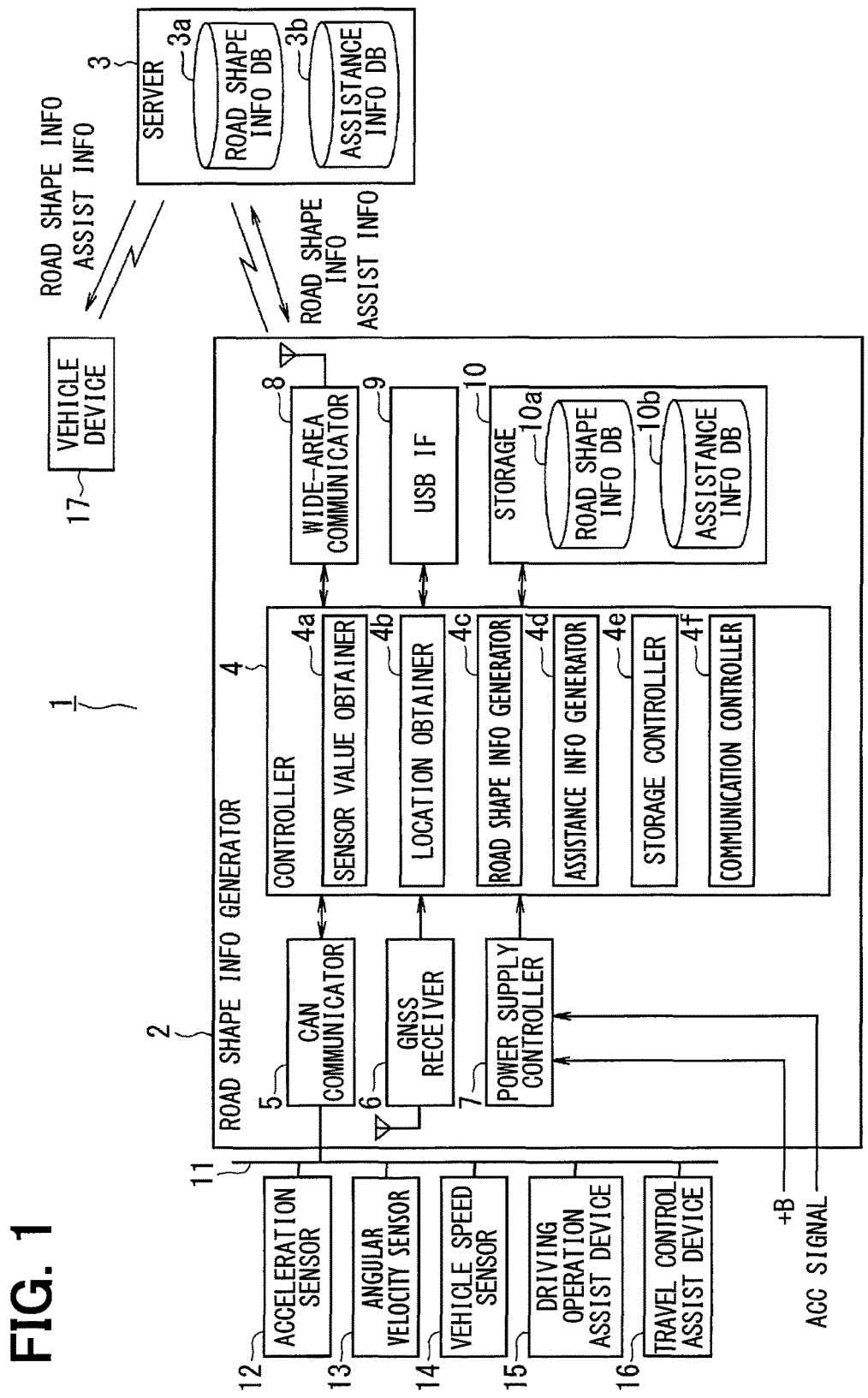
FIG. 1 shows an overall configuration of a road shape information distribution system according to an embodiment of the present disclosure.
Figure 2A:
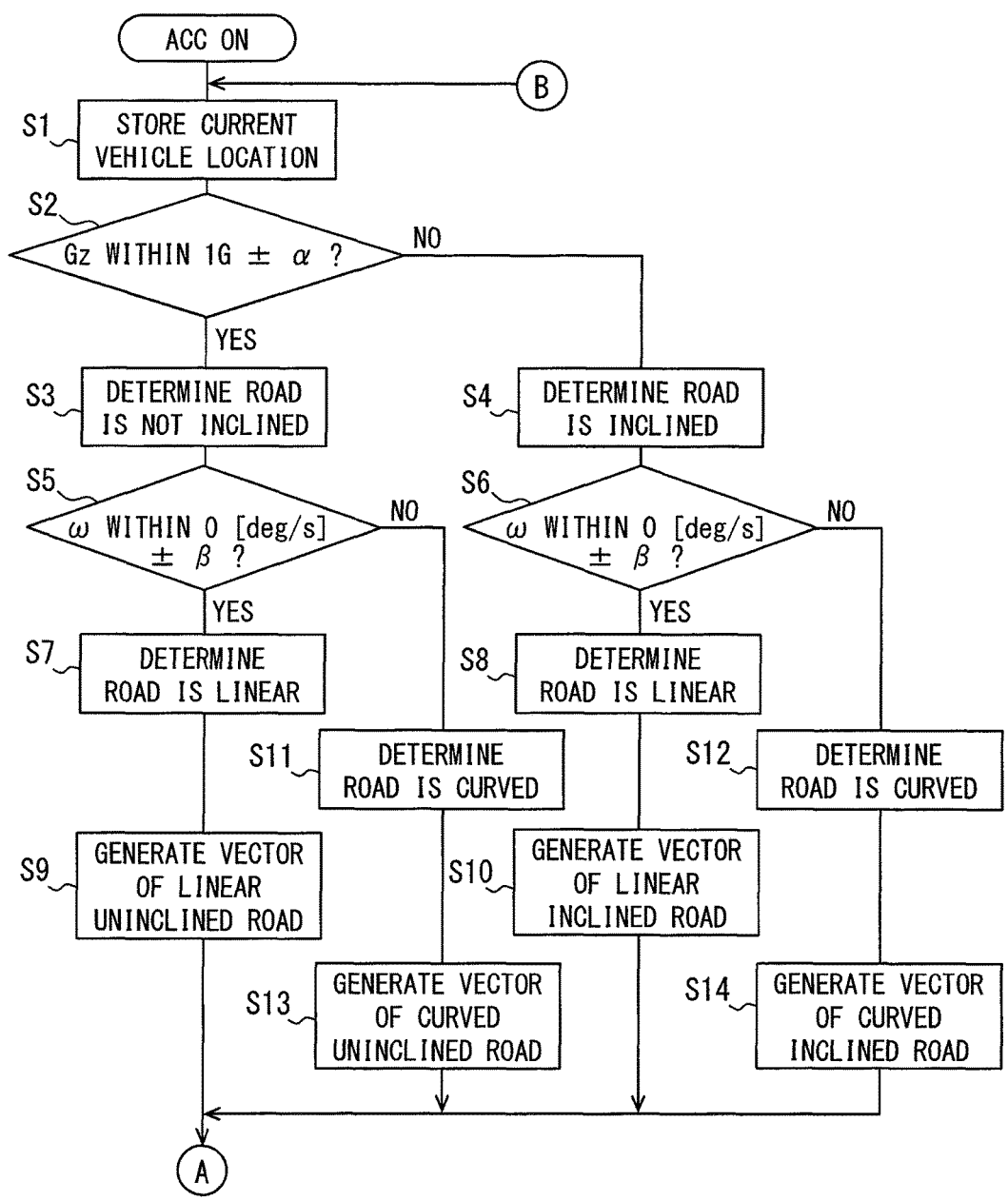
FIG. 2A shows a first half part of a flowchart.
Figure 2B:
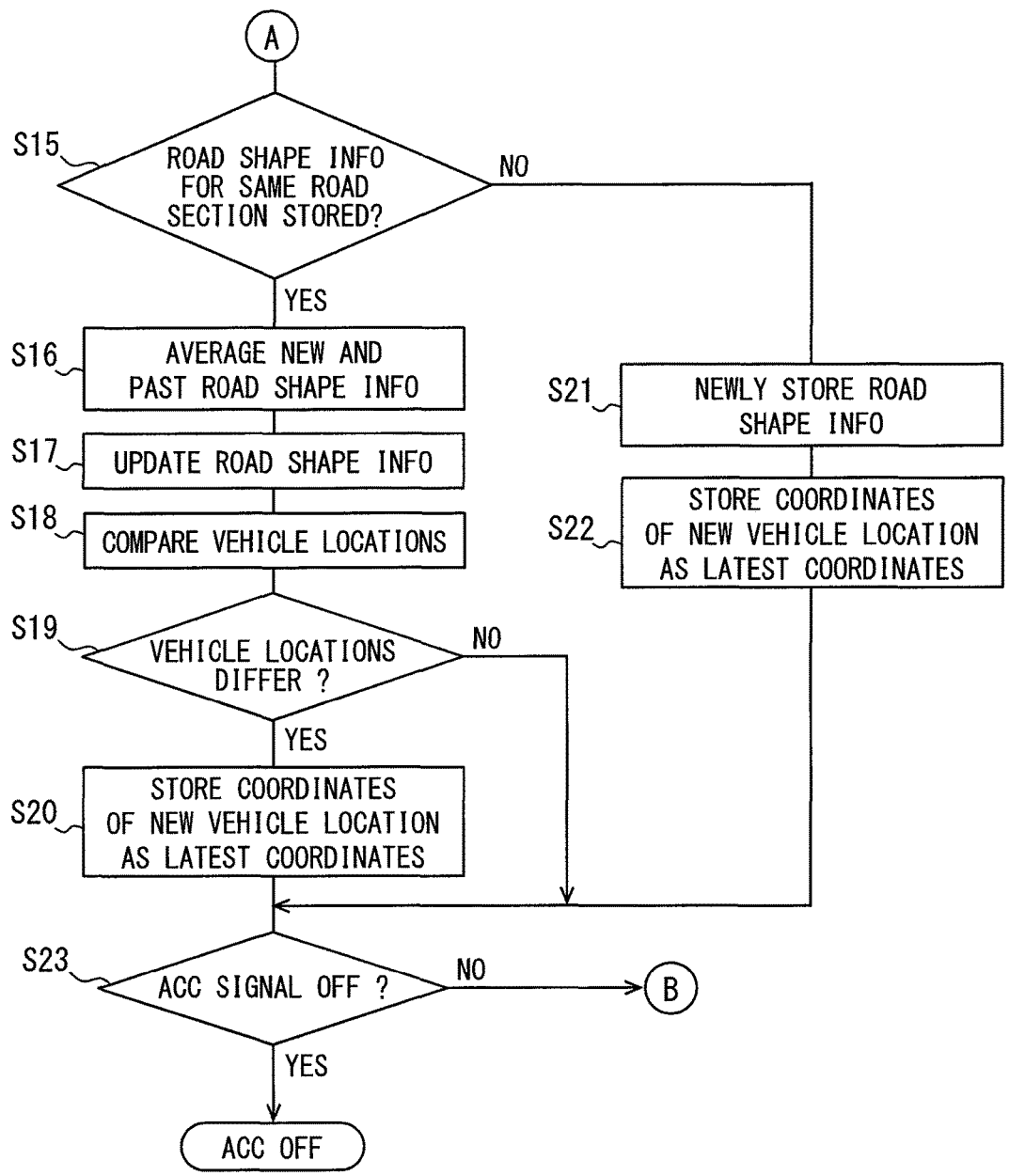
FIG. 2B shows a second half part of the flowchart.

An embodiment of the present disclosure will be described below based on drawings. As shown in FIG. 1, a road shape information distribution system 1 is configured such that a road shape information generator 2 mounted on a vehicle and a server 3 installed in a center can engage in data communication via a communication network. In the present embodiment, the road shape information generators 2 of the many and unspecified number can engage in data communication with the server 3.

The road shape information generator 2 includes a controller 4 (corresponding to the control means), a CAN (Controller Area Network) communicator 5, a GNSS (Global Navigation Satellite System) receiver 6, a power supply controller 7, a wide-area communicator 8 (corresponding to the first communicator (means) and the second communicator (means)), a USB (Universal Serial Bus) interface (IF) unit 9, and a storage 10. The controller 4 is configured with a microcomputer having a CPU (Central Processing Unit), a ROM (Read Only Memory), a RAM (Random Access Memory), and an I/O (Input/Output). The controller 4 controls operation of the entire device by executing stored computer programs.

The CAN communicator 5 has a data communication function for communication with a CAN 11 and controls communications made, via the CAN 11, with such devices mounted on the vehicle as an acceleration sensor 12, an angular speed sensor 13, a vehicle speed sensor 14, a driving operation assist device 15, and a travel control assist device 16. The acceleration sensor 12 detects and outputs acceleration (gravitational acceleration G=9.80665 m/s$^2$) in the gravitational direction. The angular speed sensor 13 detects and outputs an angular speed horizontally acting in the vehicle travel direction. The vehicle speed sensor 14 outputs a vehicle speed detected by counting vehicle speed pulses. When sensor values detected by the acceleration sensor 12, angular speed sensor 13 and vehicle speed sensor 14 are received via the CAN 11, the CAN communicator 5 outputs the received sensor values to the controller 4.

The CAN communicator 5 outputs, via the CAN 11, driving operation assistance information to the driving operation assist device 15 and travel control assistance information to the travel control assist device 15. The driving operation assist device 15 is a device to assist driver's operation. It is, for example, a display to display driving assisting guidance (e.g. guidance to call driver's attention to pedestrians) or a speaker to audibly output such guidance. The travel control assist device 15 is a device to assist vehicle travel control. It is, for example, a brake ECU (Electronic Controller) to assist deceleration or an acceleration ECU to assist acceleration.

The GNSS receiver 6 receives satellite signals and, by processing various parameters, calculates coordinates (latitude, longitude and altitude) representing the current location of the vehicle, then outputs the calculated coordinates to the controller 4. The power supply controller 7 monitors an ACC (accessory) signal. When switching of the ACC signal from off (0) to on (1) is detected, the power supply controller 7 starts supplying each function block with operational power supplied from an on-board battery (not shown), thereby waking up the entire device (an awake state). When switching of the ACC signal from on (1) to off (0) is detected, the power supply controller 7 stops supplying each function block with the operational power, thereby putting the entire device in a sleep state. The power supply controller 7 may alternatively be configured to switch the entire device between an awake state and a sleep state by monitoring an IG (ignition) signal and a wake-up signal of the CAN.

The wide-area communicator 8 engages in data communication with the server 3 via a communication network. The USBIF 9 has a data communication function complying with a USB communication standard. The storage 10 includes a road shape information database 10a (corresponding to the road shape information storage (means)) which can memorize (store) road shape information and an assistance information database 10b (corresponding to the assistance information storage (means)) which can store assistance information.

The controller 4 includes a sensor value obtainer 4a (corresponding to the sensor value obtaining means), a location obtainer 4b (corresponding to the location obtaining means), a road shape information generator 4c (corresponding to the road shape information generation means), an assistance information generator 4d (corresponding to the assistance information generation means), a storage controller 4e (corresponding to the storage control means), and a communication controller 4f (corresponding to the first communication controller (means) and the second communication controller (means)). These sensor value obtainer 4a, location obtainer 4b, road shape information generator 4c, assistance information generator 4d, storage controller 4e and communication controller 4f are formed of computer programs (including a road shape information generation program), i.e. realized by software, to be performed by the controller 4.

The sensor value obtainer 4a obtains sensor values of sensors 12 to 14 from the CAN communicator 5. The location obtainer 4b obtains coordinates representing the current vehicle location from the GNSS receiver 6. The road shape information generator 4c generates information about road shapes as road shape information based on the sensor values obtained by the sensor value obtainer 4a and the coordinates obtained by the location obtainer 4b. When the road shape information generator 4c generates road shape information, the storage controller 4e stores the generated road shape information in the road shape information database 10a. The assistance information generator 4d generates assistance information by processing the road shape information stored in the road shape information database 10a. When the assistance information generator 4d generates assistance information, the storage controller 4e stores the generated assistance information in the assistance information database 10b.

By the communication controller 4f, the road shape information stored in the road shape information database 10a and the assistance information stored in the assistance information database 10b are transmitted from the wide-area communicator 8 to the server 3 via a communication network. The communication controller 4f may cause the road shape information and the assistance information to be transmitted at any timing. For example, the information may be transmitted immediately after the ACC signal turns from on to off, i.e., immediately before the road shape information generator 2 changes from an awake state to a sleep state. The communication controller 4f may cause the generated road shape information to be transmitted immediately after generation of the road shape information by the road shape information generator 4c or may cause the generated assistance information to be transmitted immediately after generation of the assistance information by the assistance information generator 4d. Namely, the communication controller 4f may cause the generated road shape information and assistance information to be transmitted in real time.

The server 3 includes a road shape information database 3a and an assistance information database 3b. The road shape information database 3a of the server 3 is larger in capacity than the road shape information database 10a of the above road shape information generator 2 and can store more road shape information data. Similarly, the assistance information database 3b of the server 3 is larger in capacity than the assistance information database 10b of the above road shape information generator 2 and can store more assistance information data.

When road shape information is received from the road shape information generator 2, the server 3 stores the received road shape information in the road shape information database 3a. When assistance information is received from the road shape information generator 2, the server 3 stores the received assistance information in the assistance information database 3b. The server 3 generates assistance information by processing the road shape information received from the road shape information generator 2 and stores the generated assistance information in the assistance information database 3b. Furthermore, the server 3 is configured to be capable of data communication via a communication network with a vehicle device 17 mounted on a vehicle and sends the road shape information stored in the road shape information database 3a and the assistance information stored in the assistance information database 3b to the vehicle device 17 via the communication network. Namely, the server 3 can exchange road shape information and assistance information with road shape information devices 2 of the many and unspecified number capable of generating road shape information and assistance information and can distribute road shape information and assistance information to vehicle devices 17 of the many and unspecified number incapable of generating road shape information and assistance information.

Operations of the above-described configuration will be described with reference to FIGS. 2A to 5. When the ACC signal is on, i.e. when the road shape information generator 2 is in an awake state, the controller 4 performs processing represented in FIGS. 2A and 2B. When the ACC signal is on, the controller 4 periodically (e.g. at periods of several milliseconds) obtains sensor values of the sensors 12 to 14 from the CAN communicator 5 and periodically (e.g. at periods of several milliseconds) obtains coordinates representing the current vehicle location from the GNSS receiver 6.

Figure 3A:
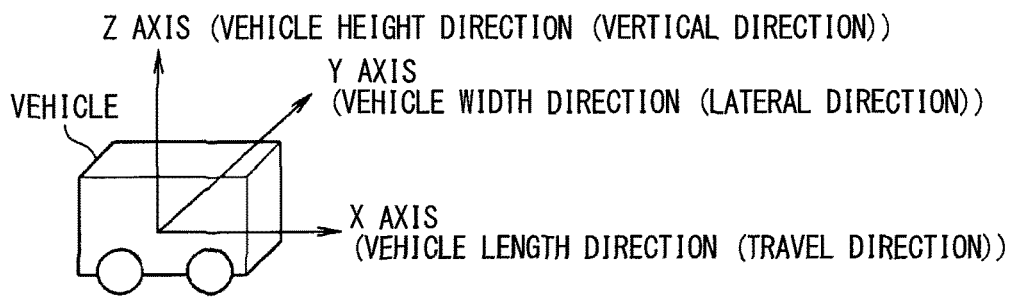
FIG. 3A is a diagram illustrating an aspect of obtaining an inclination angle.
Figure 3B:
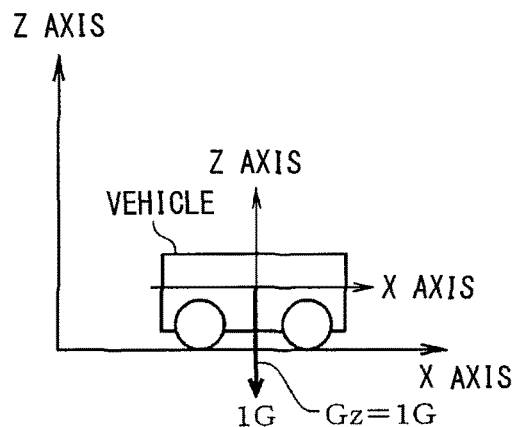
FIG. 3B is a diagram illustrating an aspect of obtaining an inclination angle.
Figure 3C:
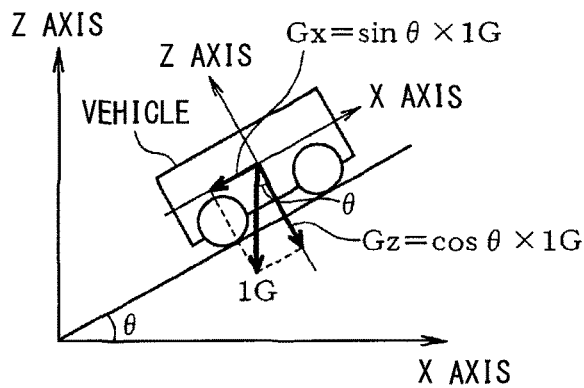
FIG. 3C is a diagram illustrating an aspect of obtaining an inclination angle.
Figure 3D:
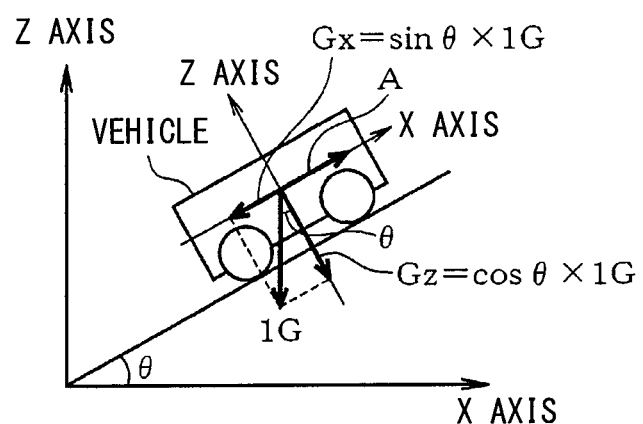
FIG. 3D is a diagram illustrating an aspect of obtaining an inclination angle.

The controller 4 stores coordinates representing the current vehicle location obtained from the GNSS receiver 4 (S1). Next, the controller 4 determines the angle of inclination in the vehicle travel direction of the road on which the vehicle is traveling based on the sensor value obtained from the acceleration sensor 12 (S2, the first procedure). Specifically, as shown in FIG. 3A, the vehicle length direction (travel direction), the vehicle width direction (lateral direction), and the vehicle height direction (vertical direction) are represented by X axis, Y axis, and Z axis, respectively. In this case, as shown in FIG. 3B, when the angle of inclination in the vehicle travel direction of the road on which the vehicle is traveling is 0 degree (not inclined), the value of acceleration acting in a perpendicular direction from the vehicle to the road surface equals Gz, that is, "1G". On the other hand, as shown in FIGS. 3C and 3D, when the angle of inclination in the vehicle travel direction of the road on which the vehicle is traveling is not 0 degree (inclined), the value of acceleration acting in a perpendicular direction from the vehicle to the road surface equals the cos component of Gz, that is, "cos θ×1G" where "θ" represents the inclination angle. As shown in FIG. 3C, when the vehicle speed is uniform, the value of acceleration acting in the direction opposite to the vehicle travel direction equals the sin component of Gz, that is, "sin θ×1G". When, as shown in FIG. 3D, the vehicle is accelerating in the travel direction, the value of acceleration acting in the direction opposite to the vehicle travel direction equals A less the sin component of Gz, that is "A−sin θ×1G", where "A" represents the acceleration in the travel direction.

When the controller 4 determines that the value of acceleration acting in the perpendicular direction from the vehicle to the road surface is in a range of "1G±α" (S2: YES) where "α" represents the measurement error of the acceleration sensor 12, the inclination angle is determined to be "0" (not inclined) (S3). On the other hand, when the controller 4 determines that the value of acceleration acting in the perpendicular direction from the vehicle to the road surface is not in the range of "1G±α" (outside the range) (S2: NO), the inclination angle is determined to be "θ" (inclined) (S4). Thus, based on a variation in the value of acceleration acting in the perpendicular direction from the vehicle to the road surface depending on whether or not the road is inclined, the controller 4 determines whether or not the road on which the vehicle is traveling is inclined in the vehicle travel direction by determining whether the value of acceleration is in the range of "1G±α".

Next, the controller 4 determines, based on the sensor value obtained from the angular speed sensor 13, whether or not the road on which the vehicle is traveling is curved in the vehicle travel direction (S5, S6, the first procedure). When the controller 4 determines that the sensor value obtained from the angular speed sensor 13 is in a range of "0 deg/s±β" (S5: YES, S6: YES) where "β" represents the measurement error of the angular speed sensor 13, the road is determined to be straight in the vehicle travel direction (S7, S8). When the controller 4 determines that the road is straight without being inclined, the controller 4 generates a vector representing this as road shape information (S9, the second procedure). When the controller 4 determines that the road is straight besides being inclined, the controller 4 generates a vector representing this as road shape information (S10, the second procedure).

Figure 4:
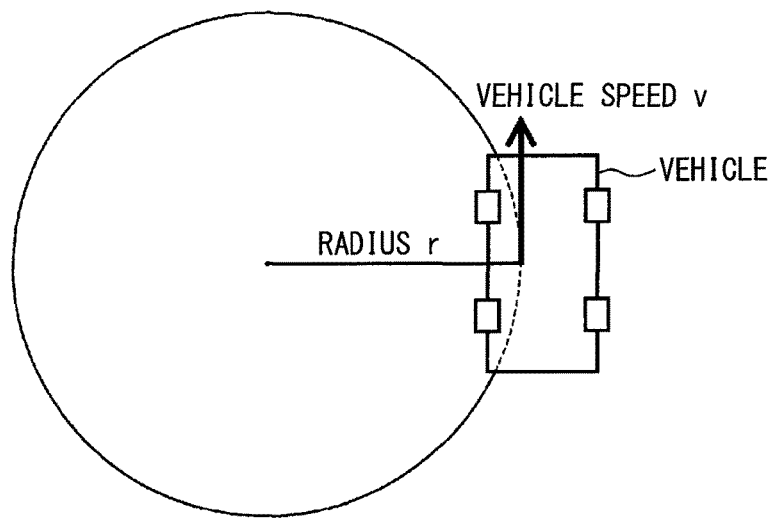
FIG. 4 is a diagram illustrating an aspect of obtaining a curve radius.

On the other hand, when the controller 4 determines that the sensor value obtained from the angular speed sensor 13 is not in the range of "0 deg/s±β" (outside the range) (S5: NO, S6: NO), the road is determined to be curved in the vehicle travel direction (S11, S12). When the road is determined to be curved without being inclined, the controller 4 generates a vector representing this as road shape information (S13, the second procedure). At this time, a relation of "v=r×ω" is satisfied where, as shown in FIG. 4, "r" represents the curve radius (curvature is 1/r) and "v" represents the vehicle speed, and the controller 4 calculates the curve radius using the sensor value obtained from the vehicle speed sensor 14, then calculates the turning angle "Φ" by integrating the angular speed with respect to time.

When the road is determined to be curved besides being inclined, the controller 4 generates a vector representing this as road shape information (S14, the second procedure). At this time, too, the controller 4 calculates the curve radius using the sensor value obtained from the vehicle speed sensor 14, then calculates the turning angle "Φ" by integrating the angular speed with respect to time. Thus, based on the variation in the value of the angular speed horizontally acting in the vehicle travel direction varies depending on whether or not the road is curved, the controller 4 determines whether or not the value of the angular speed is in the range of "0 deg/s±β" and, thereby, determines whether or not the road on which the vehicle is traveling is curved in the vehicle travel direction.

Next, the controller 4 determines, by referring to the road shape information database 10a, whether or not road shape information of a specific road section (past road shape information, past vector) is stored in the road shape information database 10a (S15), where the specific road section is a road section for which the road shape information is generated by the road shape determination this time. When it is determined that there is the stored past road shape information of the road section for which the road shape information is generated by the road shape determination this time (S15: YES), the controller 4 averages the road shape information generated this time and the past road shape information (S16) and stores the averaged road shape information in the road shape information database 10a (updates) (S17, the third procedure). The controller 4 then compares the coordinates representing the current vehicle location obtained by the road shape determination this time and the coordinates representing the vehicle location obtained by the past road shape determination, and determines the difference between the compared vehicle locations (coordinate difference) (S18). When the controller 4 determines that the difference between the compared vehicle locations equals or exceeds a predetermined value (S19: YES), the controller 4 stores the coordinates representing the current vehicle location obtained by the road shape determination this time, associating the coordinates as the latest coordinates with the road shape information, in the road shape information database 10a (S20). Thus, by averaging the road shape information, the controller 4 improves road shape information accuracy (reliability).

When it is determined that there is no stored past road shape information of the road section for which the road shape information is generated by the road shape determination this time (S15: NO), the controller 4 newly stores the road shape information generated this time in the road shape information database 10a (S21, the third procedure). The controller 4 then stores the coordinates representing the current vehicle location obtained by the road shape determination this time, associating the coordinates as the latest coordinates with the road shape information, in the road shape information database 10a (S22).

Figure 5:
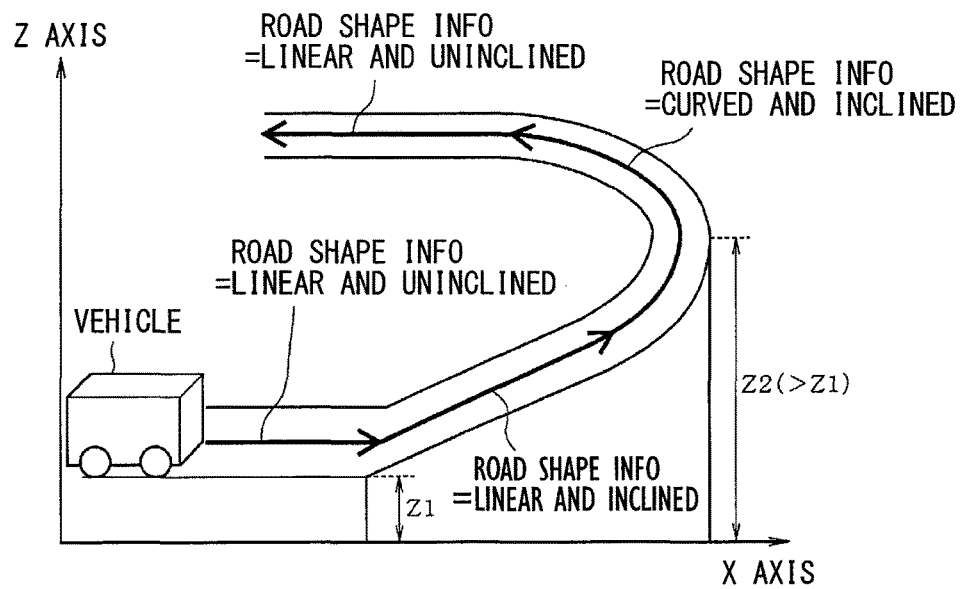
FIG. 5 is a diagram representing road shape information.

Subsequently, the controller 4 determines whether the ACC signal is turned from off to on (S23). When the ACC signal is determined to be still on (S23: NO), processing returns to step S1 to repeat the above processing. By operating as described above, the controller 4 successively generates, as shown in FIG. 5, road shape information while the vehicle is traveling. In the example shown in FIG. 5, the controller 4 successively generates road shape information "straight and uninclined," "straight and inclined," "curved and inclined," and "straight and uninclined."

In the road shape information generator 2, the controller 4 generates assistance information by processing the road shape information generated during the vehicle traveling and stores the generated assistance information in the assistance information database 10b as described above. As the assistance information, the controller 4 generates driving operation assistance information to assist the driving operation of the driver and travel control assistance information to assist vehicle travel control. When driving operation assistance information and travel control assistance information are generated and stored in the assistance information database 10b by the controller 4, the controller 4 causes, according to the current location of the vehicle, the necessary driving operation assistance information and travel control assistance information to be outputted from the CAN communicator 5 to the driving operation assist device 15 and the travel control assist device 16 via the CAN 11 and, thereby, assists the driving operation of the driver and vehicle travel control. To be specific, when the vehicle is about to enter a downward slope with a relatively large inclination and a relatively large curve radius, the controller 4 causes, for example, guidance to urge braking to be shown on a display and to be audibly outputted from a speaker, while also ordering the brake ECU to carry out deceleration assistance. In a case where the vehicle is a hybrid car using an electric motor as a drive source, the controller 4 causes, for example, by effecting a transition from an ordinary mode to an energy regenerative mode, switching from ordinary driving to ecological driving with consideration given to the global environment.

Alternatively, the server 3 may receive and process the road shape information generated by the road shape information generator 2, thereby, generating assistance information and may, then, distribute (feed back) the generated assistance information to the road shape information generator 2 and the vehicle device 17. Namely, in the road shape information distribution system 1, assistance information may be generated by the road shape information generator 2 or may be generated by the server 3 by processing road shape information collected from the road shape information generators 2 of the many and unspecified number. The server 3 may then distribute the generated assistance information to many and unspecified road shape information devices 2 and vehicle devices 17.

Though information about the angle of a road inclination and the radius of a road curve in the vehicle travel direction is generated based on sensor values obtained by the sensors 12 to 14 and inputted via the CAN communication 5 in the above illustration, information about a road width may be generated by inputting coordinates representing the current location of the vehicle via the GNSS receiver 6. Namely, the controller 4 may determine that the road is relatively wide when the coordinates representing the current location of the vehicle relatively largely vary over a predetermined range and that the road is relatively narrow when variations of the coordinates representing the current location of the vehicle are relatively small over the predetermined range.

The present embodiment illustrated above provides the following effects.

In the road shape information generator 2, without using means for imaging a vehicle traveling on a road or means for processing and analyzing image data, road shape information is generated based on sensor values obtained from the sensors 12 to 14 and the generated road shape information is stored. In this way, road shape information can be appropriately generated without requiring any high-spec CPU or a large-capacity memory and without causing configuration complication or a cost increase, and the generated road shape information can be effectively utilized.

In this case, information about a road inclination angle in the vehicle travel direction is generated based on a sensor value representing acceleration in the gravitational direction. Information about a road inclination angle in the vehicle travel direction can be thus generated. Information about the radius of a road curve in the vehicle travel direction is generated based on sensor values representing the vehicle angular speed horizontally acting in the vehicle travel direction and the vehicle speed. Information about the radius of a road curve in the vehicle travel direction can be thus generated. In a method in which information about the radius of a road curve is generated based on the angle of turning the steering wheel, the angle of turning the steering wheel depends on the vehicle model, and thus, it is necessary to prepare different tables for different vehicle models. In the present embodiment, information about the radius of a road curve is generated based on a sensor value. This is an advantage in that information about the radius of a road curve can be generated without being dependent on the vehicle model.

In the present embodiment, by processing road shape information, driving operation assistance information to assist the driving operation of a driver and travel control assistance information to assist vehicle travel control is generated. This makes it possible to appropriately assist the driving operation of a driver and vehicle travel control according to the angle of the road inclination and the radius of the road curve in the vehicle travel direction.

Furthermore, in the server 3, road shape information and assistance information is received/collected from many and unspecified road shape information generators 2 and the collected road shape information and assistance information is distributed to many and unspecified road shape information generators 2 and vehicle devices 17. In this way, road shape information and assistance information can be shared by many and unspecified road shape information generators 2 and vehicle devices 17. For example, the driving operation of a vehicle driver driving on a certain road for the first time and travel control for the vehicle can be appropriately assisted using road shape information and assistance information provided by the road shape information generator 2 mounted on another vehicle.

The embodiment is not limited to the above-described form and can be modified or expanded as desired without departing from the technical idea of the present disclosure.

The above embodiment illustrates a configuration including the road shape information generator 2 as a dedicated device for generating road shape information, but the function described in connection with the above embodiment may be incorporated in a device having another function. Namely, the function described in connection with the above embodiment may be one incorporated in, for example, a navigation device.

The above embodiment illustrates a configuration in which sensor values are obtained from the sensors 12 to 14 mounted outside the road shape information generator 2, but, in an alternative configuration, the sensors 12 to 14 may be incorporated in the road shape information generator 2.

The above embodiment illustrates a configuration in which road shape information and assistance information is outputted to outside by way of transmission to the server 3, but road shape information and assistance information may be utilized by way of transfer to, for example, a storage medium such as USB flash drives.

What is claimed is:

1. A road shape information generator, comprising:
a road shape information storage; and
a controller configured to:
obtain a sensor value acting, when a vehicle travels on a road section, on the vehicle;
generate information about a road shape of the road section as current road shape information based on the obtained sensor value;
determine whether the road shape information storage already contains previous road shape information for the road section; and
in response determining that the road shape information storage already contains the previous road shape information for the road section, (i) generate average road shape information by averaging the current road shape information with the previous road shape information, (ii) store the average road shape information in the road shape information storage, (iii) determine current coordinates representing a current location of the vehicle when the current road shape information is generated, (iv) determine a difference between the current coordinates representing the current location of the vehicle and previous coordinates representing a previous location of the vehicle when the previous road shape information was generated, (v) compare the difference with a predetermined value, (vi) in response to the difference being greater than the predetermined value, store the current coordinates as latest coordinates associated with the average road shape information in the road shape information storage.

2. The road shape information generator according to claim 1, wherein:
the obtained sensor value represents an acceleration acting in a perpendicular direction from the vehicle to a road surface; and
the controller is further configured to generate information about a road inclination angle in a vehicle travel direction as the road shape information based on the obtained sensor value representing the acceleration.

3. The road shape information generator according to claim 1, wherein:
the sensor value represents an angular speed acting in a vehicle travel direction and vehicle speed; and
the controller is further configured to obtain information about a radius of a road curve in the vehicle travel direction as the road shape information based on the obtained sensor value representing the angular speed and the vehicle speed.

4. The road shape information generator according to claim 1, wherein
the controller is further configured to obtain a current vehicle location, and
generate the road shape information based on the obtained current vehicle location.

5. The road shape information generator according to claim 4, wherein
the controller is further configured to generate information about a road width as the road shape information.

6. The road shape information generator according to claim 4, wherein
the controller is further configured to correct, based on the obtained current vehicle location, the road shape information generated based on the obtained sensor value.

7. The road shape information generator according to claim 1, further comprising
a communication controller that causes the road shape information stored in the road shape information storage to be transmitted from a first communicator to a server.

8. The road shape information generator according to claim 1, wherein
the controller is further configured to generate assistance information by processing the road shape information stored in the road shape information storage, and
store, in an assistance information storage, the generate assistance information.

9. The road shape information generator according to claim 8, wherein
the controller is configured to generate as the assistance information at least either driving operation assistance information to assist driving operation of a driver or travel control assistance information to assist vehicle travel control.

10. The road shape information generator according to claim 8, further comprising a communication controller that causes the assistance information stored in the assistance information storage to be transmitted from a second communicator to a server.

11. A road shape information distribution system, comprising
the road shape information generator according to claim 7 and the server.

12. The road shape information distribution system according to claim 11, wherein
the server stores the road shape information received from the road shape information generator, generates assistance information by processing the received road shape information and stores the generated assistance information.

13. The road shape information distribution system according to claim 12, wherein
the server generates as the assistance information at least either driving operation assistance information to assist driving operation of a driver or travel control assistance information to assist vehicle travel control.

14. The road shape information distribution system according to claim 12, wherein
the server distributes the generated assistance information to a vehicle device.

15. A non-transitory storage medium storing a road shape information generation program that causes a controller of a road shape information generator to:

obtain a sensor value acting on a vehicle when the vehicle travels on a road section;
generate information about a road shape of the road section as current road shape information based on the obtained sensor value;
determine whether the road shape information storage already contains previous road shape information for the road section;
in response determining that the road shape information storage already contains the previous road shape information for the road section, (i) generate average road shape information by averaging the current road shape information with the previous road shape information, (ii) store the average road shape information in the road shape information storage, (iii) determine current coordinates representing a current location of the vehicle when the current road shape information is generated, (iv) determine a difference between the current coordinates representing the current location of the vehicle and previous coordinates representing a previous location of the vehicle when the previous road shape information was generated, (v) compare the difference with a predetermined value, (vi) in response to the difference being greater than the predetermined value, store the current coordinates as latest coordinates associated with the average road shape information in the road shape information storage.

* * * * *